United States Patent Office 3,472,865
Patented Oct. 14, 1969

3,472,865
SUBSTITUTED BENZIMIDAZOLE COMPOUNDS
Geoffrey Tattersall Newbold, Saffron Walden, and Albert Percival, Hauxton, England, assignors to Fisons' Pest Control Limited, Harston, England
No Drawing. Filed Jan. 12, 1967, Ser. No. 608,741
Claims priority, application Great Britain, Jan. 13, 1966,
1,581/66
Int. Cl. C07d 49/38
U.S. Cl. 260—309.2        5 Claims

ABSTRACT OF THE DISCLOSURE

Substituted benzimidazole compounds of the formula

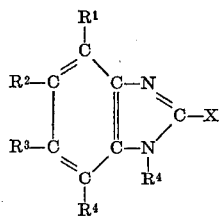

wherein in the above formula $R^1$, $R^2$, $R^3$ and $R^4$ are selected from the group consisting of hydrogen, alkyl, hydroxy, alkoxy, aryloxy, nitro, halogen, pseudo-halogen, substituted alkyl, carboxy, carboxy ester, carboxy amide, N-substituted carboxyamide, N-disubstituted carboxy amide; amino, mono-substituted amino, di-substituted amino, thiol, alkylthiol, and oxygenated derivatives thereof, substituted amides, sulphonic acid and esters and amides and oxygenated derivatives thereof, and a heterocyclic ring attached to the benzimidazole system through a nitrogen atom, radicals where X is selected from the group consisting of trifluoromethyl and pentafluoroethyl and where $R^5$ is selected from the group consisting of alkenyl, substituted alkenyl, alkynyl and substituted alkynyl.

---

The present invention relates to certain substituted benzimidazoles which have been found to possess biocidal activity, to their preparation and to agricultural chemical and related compositions containing the same.

It has been found that the substituted benzimidazoles as hereinafter described are active as pesticides in many fields viz as herbicides, insecticides, molluscides, fungicides and bactericides; certain members are highly active as herbicides and insecticides.

Accordingly the present invention is for a biocidally active composition which contains as an active ingredient a substituted benzimidazole of the following formula:

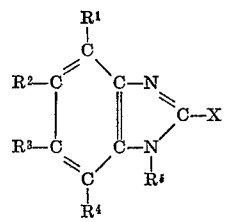

(Formula 1) wherein the above formula $R^1$, $R^2$, $R^3$ and $R^4$ may be the same or different and are selected from the group comprising hydrogen, alkyl (for example of 1–6 carbon atoms such as methyl, ethyl or propyl), hydroxy, alkoxy (for example methoxy, ethoxy, or butoxy), nitro, halogen (for example chloro, bromo or fluoro), pseudo-halogen (for example cyano, thiocyano, isothiocyano or azido), substituted alkyl (for example trifluoromethyl, chloromethyl, bromomethyl, trichloromethyl, hydroxymethyl, 2-chloroethyl, 2-hydroxyethyl or 2-methoxyethyl), carboxy, carboxy ester, carboxy amide, N-substituted or N-disubstituted carboxy amide, amino or mono or di-substituted amino (for example methylamino, dimethylamino, acetylamino, trifluoroacetylamino, benzenesulphonamido, methanesulphonamide) aryloxy (for example phenoxy), thiol, alkylthiol and oxygenated derivatives thereof (for example —$SOR^6$ or $SO_2R^6$ where $R^6$ is alkyl) sulphonic acid and esters and amides thereof and substituted amides (for example phenylsulphamyl, ethylsulphamyl, chloroethylsulphamyl) and a heterocyclic ring attached to the benzimidazole system through a nitrogen atom, radicals, where X is trifluoromethyl or pentafluoroethyl, and where $R^5$ is alkenyl (for example allyl, butenyl) substituted alkenyl (for example dichlorallyl), alkynyl (for example propargyl, butynyl), or substituted alkynyl (for example chlorobutynyl).

The present invention is also for a biocidally active composition which contains a substituted benzimidazole as identified above and at least one material selected from the group comprising wetting agents, inert diluents and solvents.

The present invention is also for the treatment of plants, materials, animals, the soil, land or aquatic areas which comprises applying thereon or thereto a substituted benzimidazole or a biocidally active composition as defined above. The materials treated according to the invention may be any material susceptible to attack by detrimental organisms such as fabric, paper and wood.

The present invention also comprises the new substituted benzimidazoles of Formula 1 wherein the groups $R^1$, $R^2$, $R^3$, $R^4$ and $R^5$ and X have the significance indicated above.

It has been found that the substituted benzimidazoles according to the invention generally possess biocidal activity. Many of these compounds are useful as insecticides, or as herbicides. The term biocidal is to be understood as also covering plant growth and insect attractant activities.

According to a preferred embodiment, the present invention is for compounds of Formula 1, wherein $R^1$, $R^2$, $R^3$, $R^4$, $R^5$ and X have the significance indicated above but where at least one of the groups $R^1$, $R^2$, $R^3$ and $R^4$ is chlorine, bromine, iodine, fluorine, nitro, amino, alkyl or trifluoromethyl, suitably also where $R^5$ is allyl or propargyl, and where X is trifluoromethyl.

According to one embodiment of the invention, in the case of N-alkenyl derivatives, the substituted benzimidazoles as indicated are prepared by reacting the corresponding benzimidazole derivative unsubstituted in the 1-position with a chloroformate, in accordance with the following formula:

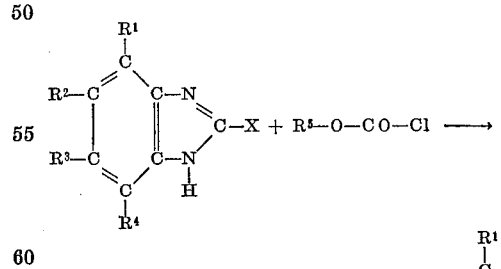

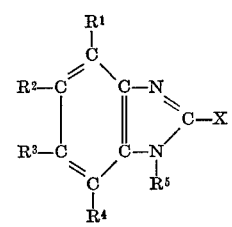

wherein the above formula $R^1$, $R^2$, $R^3$, $R^4$, $R^5$ and X have the significance indicated above, in the presence of an organic base (for example triethylamine) and a solvent (for example acetone).

Alternatively the substituted benzimidazoles may be prepared by reacting the corresponding benzimidazole derivative unsubstituted in the 1-position with the halide of the formula $R^5Z$, where Z is halogen, in the presence of a base (for example potassium carbonate) and a solvent (for example acetone).

In the case of the substituted benzimidazoles bearing an amino group, these are suitably prepared by the reduction of the corresponding nitro-substituted benzimidazole. In the case of the substituted benzimidazole bearing a nitro group, these are suitably prepared by the nitration of the corresponding substituted benzimidazole.

The substituted benzimidazole may be incorporated into biocidally active compositions, in any of the usual ways, with or without wetting agents and inert diluents.

If desired the substituted benzimidazoles may be dissolved in a water immiscible solvent, such as for example a high boiling hydrocarbon, suitably containing dissolved emulsifying agents so as to act as a self-emulsifiable oil on addition to water.

The substituted benzimidazoles may also be admixed with a wetting agent with or without an inert diluent to form a wettable powder which is soluble or dispersible in water, or may be mixed with the inert diluent to form a solid or powdery product.

Inert diluents with which the substituted benzimidazoles and salts thereof may be incorporated include solid inert media comprising powdered or divided solid materials, for example, clays, sands, talc, mica, fertilizers and the like, such products either comprising dust or larger particle size materials.

The wetting agents used may comprise anionic compounds such as for example soaps, fatty sulphate esters such as dodecyl sodium sulphate, fatty aromatic sulphonates such as alkylbenzene sulphonates or butyl naphthalene sulphonate, more complex fatty sulphonates such as the amide condensation product of oleic and N-methyl taurine or the sodium sulphonate of dioctyl succinate.

The wetting agents may also comprise non-ionic wetting agents such as for example condensation products of fatty acids, fatty alcohols or fatty substituted phenols with ethylene oxide, or fatty esters or sugars or polyhydric alcohols, or the products obtained from the latter by condensation with ethylene oxide, or the products known as block copolymers of ethylene oxide and propylene oxide. The wetting agents may also comprise cationic agents such as for example cetyl trimethyl-ammonium bromide and the like.

The biocidally active compositions according to the present invention may contain in addition to the substituted benzimidazole or salts thereof, other physiologically active materials such as herbicides, insecticides, fungicides and mollusicides. Insecticidal compositions may contain edible substances attractive to insects such as sugar, molasses and protein hydrolysates, suitably also with specific insect attractants.

The following examples are given to illustrate the present invention.

EXAMPLE 1

A solution of allyl chloroformate (6.6 g.) in dry acetone (10 ml.) was added to a mixture of 4,5,6-trichloro-2-trifluoromethyl benzimidazole (14.5 g., 0.05 M), dry triethylamine (7.6 ml.) and dry acetone (50 ml.). The mixture was refluxed for 1 hour, cooled and the precipitate filtered. The filtrate was evaporated to dryness and the residual oil was taken up in ethanol and allowed to crystallise to give white needles of 1-allyl-4,5,6-trichloro-2-trifluoromethyl benzimidazole (5.2 g., M.P. 83–84°).

Found: C, 40.30%; H, 1.95%; Cl, 32.40%; N, 8.65%. $C_{11}H_6Cl_3F_3N_2$ requires: C, 40.09%; H, 1.84%; Cl, 32.28%; N, 8.50%.

EXAMPLE 2

A mixture of 4,5,6-trichloro-2-trifluoromethyl benzimidazole (21.7 g.), propargyl bromide (9.74 g.), potassium carbonate (5.7 g.) and dry acetone (250 ml.) was refluxed for 8 hours. The insoluble residue was filtered off and the filtrate evaporated to dryness to give an oil which solidified. The solid was washed with 5% sodium hydroxide solution, water and then dried. Recrystallisation from 50% aqueous ethanol gave 1-propargyl-4,5,6-trichloro-2-trifluoromethyl benzimidazole (3.7 g. M.P. 101–102°).

Found: C, 40.55%; H, 1.4%; N, 8.75%. $C_{11}H_4Cl_3F_3N_2$ requires: C, 40.32%; H, 1.23%; N, 8.55%.

EXAMPLES 3–8

In a similar way to Example 2 the following compounds were prepared:

1-propargyl-4(7)-bromo-5,6,7(4,5,6)-trichloro-2-trifluoromethyl benzimidazole (M.P. 150° C.).
1-propargyl-5,6-dichloro-2-trifluoromethyl benzimidazole M.P. 151–152° C.).
1-propargyl-5(6)-nitro-2-trifluoromethyl benzimidazole (M.P. 85–90° C.).
1-propargyl-4-nitro-6-chloro-2-trifluoromethyl benzimidazole (M.P. 110° C.).
1-propargyl-4,5,7-trichloro-2-trifluoromethyl benzimidazole (M.P. 115° C).
1-crotyl-4,5,6-trichloro-2-trifluoromethyl benzimidazole (M.P. 25° C.) (prepared using crotyl bromide in place of propargyl bromide).

EXAMPLE 9

Peas, mustard, linseed, surgarbeet, Condor oats, and rye grass were grown in John Innes potting compost in aluminium pans (7½ ins. x 3¾ ins. area x 2 ins. depth). When the plants had between 2 and 5 true leaves they were sprayed with an aqueous acetone solution of each of the compounds identified below in aqueous acetone at a rate corresponding to 10 lbs./acre. After 7 days in a controlled environment room at 22° C. with 14 hours per day of illumination of 800 ft. candles and a relative humidity of 75–90% the plants were examined visually for post-emergent herbicidal effect. The results are tabulated below; 100 indicates complete destruction of the plant, 0 indicates no herbicidal effect.

| Compound | Herbicidal effect | | | | | |
|---|---|---|---|---|---|---|
| | Mustard | Linseed | Peas | Sugarbeet | Condor oats | Rye grass |
| 1-allyl-4,5,6-trichloro-2-trifluoromethyl benzimidazole | 15 | 75 | 5 | 100 | 23 | 30 |
| 1-propargyl-4,5,6-trichloro-2-trifluoromethyl-benzimidazole | 100 | 100 | 65 | 100 | 75 | 65 |
| 1-crotyl-4,5,6-trichloro-2-trifluoromethyl benzimidazole | 40 | 90 | 15 | 100 | 30 | 15 |
| 1-propargyl-4,5,7-trichloro-2-trifluoromethyl benzimidazole | 100 | 35 | 20 | 40 | 20 | 0 |
| 1-propargyl-5(6)-nitro-2-trifluoromethyl benzimidazole | 100 | 70 | 12 | 90 | 18 | 20 |

EXAMPLE 10

1 inch diameter circular discs of French bean leaves (*Phaseolus vulgaris*) were cut out and infested with adult female mites (*Tetranvchus telarius*) and left for 24 hours. During this time each mite laid approximately 10 eggs. The adult mites were then removed and the leaf discs with the eggs dipped into an aqueous acetone suspension of one of the compounds identified below, dried and incubated for five days at 20–22° C. After this period, no larvae were found to have emerged from the eggs, in any case.

1-allyl-4,5,6-trichloro-2-trifluoromethyl benzimidazole.
1-propargyl-5(6)-nitro-2-trifluoromethyl benzimidazole.
1-propargyl-4,5,6-trichloro-2-trifluoromethyl
  benzimidazole.
1-crotyl-4,5,6-trichloro-2-trifluoromethyl benzimidazole.

We claim:
1. A substituted benzimidazole compound of the formula

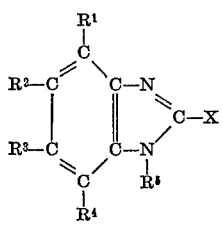

wherein $R^1$, $R^2$, $R^3$ and $R^4$ each represents a member selected from the group consisting of hydrogen, halogen, nitro, amino, alkyl of 1 to 6 carbon atoms and trifluoromethyl, X is selected from the group consisting of trifluoromethyl, and pentafluoroethyl, and $R^5$ represents a member selected from the group consisting of lower alkenyl and lower alkynyl.

2. A substituted benzimidazole compound as defined in claim 1, wherein at least one of $R^1$, $R^2$, $R^3$ and $R^4$ is selected from the group consisting of halogen, nitro, amino, alkyl of 1 to 6 carbon atoms and trifluoromethyl.

3. A substituted benzimidazole compound as defined in claim 1, wherein X represents trifluoromethyl.

4. A compound as defined in claim 1, said compound being 1-allyl-4,5,6-trichloro-2-trifluoromethyl-benzimidazole.

5. A compound as in claim 1, said compound being 1 - propargyl - 4,5,6 - trichloro - 2 - trifluoromethyl - benzimidazole.

References Cited
UNITED STATES PATENTS

| | | | |
|---|---|---|---|
| 2,623,879 | 12/1952 | Ringwald et al. | 260—309.2 |
| 2,773,869 | 12/1956 | Leavitt | 260—309.2 |
| 2,811,520 | 10/1957 | Gailliot et al. | |
| 3,036,064 | 5/1962 | Schindler. | |
| 3,192,227 | 6/1965 | Brown et al. | 260—309.2 |

FOREIGN PATENTS 659,384   8/1965   Belgium.

OTHER REFERENCES

Braz et al.: Chem. Abst., vol. 62, col. 14657 (1965), QD1.A51.

Houben-Weyl: Methoden der Organischen Chemie, vol. II/I Stickstoffverbindungen II, p. 950, Stuttgart, Thiene, 1957, QD258.H7.

Morgan: Jour. Chem. Soc. (London) 1961, pp. 2344–5 relied on, QD1.C6.

Wagner et al.: Synthetic Organic Chemistry, p. 646, New York, Wiley, 1953, QD262.W24.

JOHN D. RANDOLPH, Primary Examiner

NATALIE TROUSOF, Assistant Examiner

U.S. Cl. X.R.

71—92; 424—273; 260—463, 999